No. 852,566. PATENTED MAY 7, 1907.
E. H. LANE.
PIE PAN.
APPLICATION FILED FEB. 10, 1906.
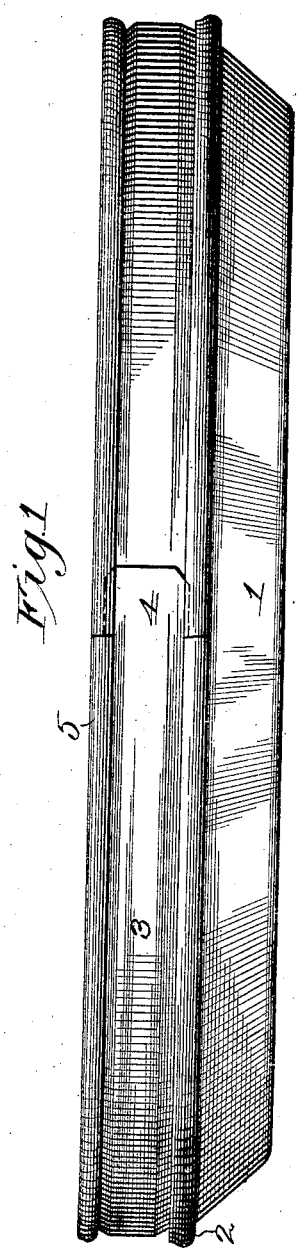
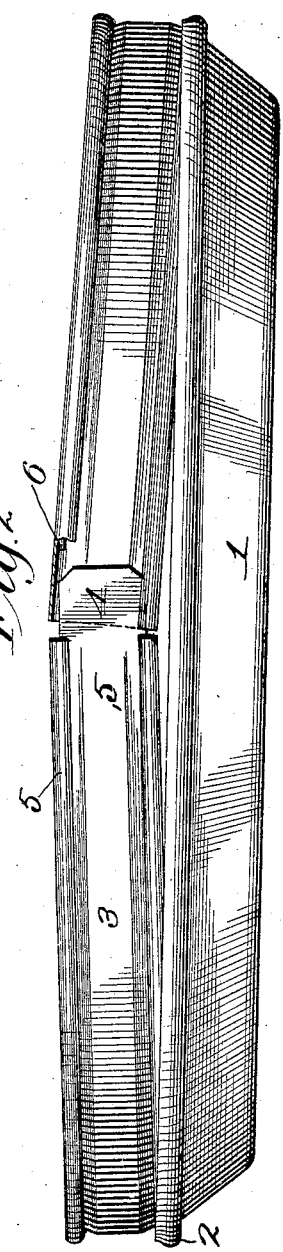
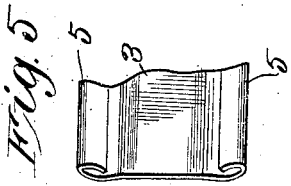
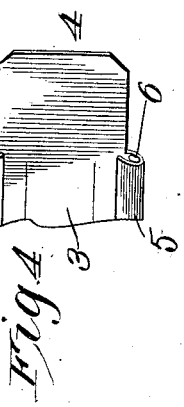
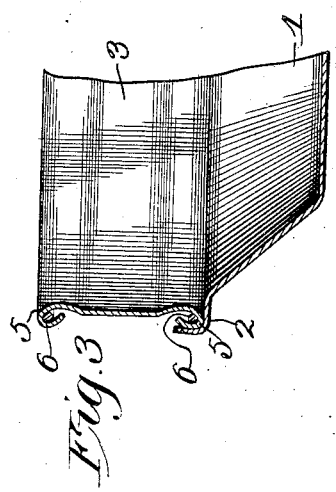
Witnesses
Frank R. Glore.
H. C. Rodgers.
Inventor
Edwin H. Lane
By George (illegible) Atty.

UNITED STATES PATENT OFFICE.

EDWIN H. LANE, OF KANSAS CITY, MISSOURI.

PIE-PAN.

No. 852,566.   Specification of Letters Patent.   Patented May 7, 1907.

Application filed February 10, 1906. Serial No. 300,421.

*To all whom it may concern:*

Be it known that I, EDWIN H. LANE, a citizen of the United States, residing at Kansas City, in the county of Jackson and State of Missouri, have invented certain new and useful Improvements in Pie-Pans, of which the following is a specification.

This invention relates to pie pans and more particularly to a pie-pan or similar pan equipped with a supplemental rim employed for the purpose of retaining the juice of a pie for example, and for trimming the superfluous dough projecting over the edge of the pipe-pan proper, and my object is to produce a device of the character outlined of simple and economical construction, and which can be easily and quickly secured to or removed from the pan.

To this end the invention consists in certain novel and peculiar features of construction and organization as hereinafter described and claimed and in order that it may be fully understood reference is to be had to the accompanying drawing, in which—

Figure 1, is a side elevation of a pie-pan embodying my invention. Fig. 2, is a similar view with the supplemental rim in a position it occupies while being secured to or detached from the pan proper. Fig. 3, is an enlarged vertical section to show clearly the construction of the pan and the supplemental rim and their relative positions when clamped together. Figs. 4 and 5 show elevations of the opposite ends of the supplemental rim.

In the said drawings, 1 indicates the pan which is preferably of circular form and formed at its upper edge with a hollow bead 2, the hollow side of the same being disposed upwardly and inwardly.

3 indicates a supplemental rim, the same being formed of any suitable metal having the necessary degree of resiliency, such as tin, and said rim is provided at one end with a tongue 4 and is also provided at its upper and lower margins with outwardly turned beads 5, said beads extending from one end of the rim to the tongue 4, and said beads are stiffened preferably by wires 6 which extend by preference from the tongue and terminate at their opposite ends short of the opposite ends of the beads a distance slightly exceeding the length of the tongue in order that the space in said beads not occupied by the wires shall form grooves to receive said tongue when the rim is completely interlocked with the hollow bead of the pan, it being noticed in this connection that the depth of the tongue is somewhat less than the depth of the supplemental rim in order to permit the ends of the rim to be disposed at an angle to each other as shown in Fig. 2, while the rim is being secured upon or removed from the pan.

By permitting the ends of the supplemental rim to be thus manipulated it is obvious that said rim has a shearing action on the dough while being secured upon the pan and it is likewise obvious that the shearing action which takes place in removing the rim from the pan enables the operator to remove the rim with practically no danger of lifting or breaking the crust of the pie, or breaking the cake or whatever has been baked in the pan. In placing this rim upon the pan, the lower bead—either bead may be disposed downwardly—is fitted in the hollow bead of the pan at a point directly opposite the tongue of the rim. Inward and downward pressure is then applied upon the tongue to cause the same to engage the unobstructed ends of the beads 5 after which a final downward pressure is applied upon the rim above or contiguous to the tongue to cause the ends of the bead below to enter and interlock with the hollow bead so that the pan and rim shall occupy the relation shown in Fig. 1. When in this relation the connection between the pan and supplemental rim is liquid tight so as to prevent the fillings of the pies from breaking through the crust and running out in baking.

It is obvious that when the supplemental rim is in place that it forms practically a deep pan and can therefore be used for the baking of puddings, cobblers, etc.

From the above description it will be apparent that I have produced a pie-pan embodying the features of advantage enumerated as desirable and which is susceptible of modification in minor particulars without departing from the spirit and scope of the appended claims.

Having thus described the invention what I claim as new and desire to secure by Letters Patent, is:—

The combination with a pan having a hollow bead, of a supplemental rim having beads at its upper and lower margins and having a tongue projecting beyond the beads at one end, and stiffening wires for said beads terminating at one end short of the ends of the beads a distance equal to the length of the tongue and leaving said beads unobstructed for the reception of the upper and lower edges of the tongue.

In testimony whereof I affix my signature in the presence of two witnesses.

EDWIN H. LANE.

Witnesses:
 H. C. RODGERS,
 G. Y. THORPE.